United States Patent
Anderson et al.

(10) Patent No.: US 10,394,059 B1
(45) Date of Patent: Aug. 27, 2019

(54) THERMO-OPTIC PHASE SHIFTER WITH THERMAL BRIDGE

(71) Applicant: Cisco Technology, Inc., San Jose, CA (US)

(72) Inventors: Sean P. Anderson, Macungie, PA (US); Ming Gai Stanley Lo, Breinigsville, PA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/221,300

(22) Filed: Dec. 14, 2018

(51) Int. Cl.
  *G02F 1/01* (2006.01)
  *G02F 1/025* (2006.01)

(52) U.S. Cl.
  CPC .......... *G02F 1/0147* (2013.01); *G02F 1/011* (2013.01); *G02F 1/025* (2013.01); *G02F 2203/50* (2013.01)

(58) Field of Classification Search
  CPC ........ G02F 1/0147; G02F 1/011; G02F 1/025; G02F 2203/50
  See application file for complete search history.

(56) References Cited

U.S. PATENT DOCUMENTS

| | | | |
|---|---|---|---|
| 7,330,630 B2* | 2/2008 | Tanaka | G02F 1/225 385/139 |
| 7,565,038 B2* | 7/2009 | Earnshaw | G02F 1/0147 385/1 |

OTHER PUBLICATIONS

Watts et al., "Adiabatic thermo-optic Mach-Zehnder switch," Mar. 1, 2013 / vol. 38, No. 5 / Optics Letters, 3 pages.
Harjanne et al., "Sub-?s switching time in silicon-on-insulator Mach-Zehnder thermooptic switch", 2039-2041, Date of Publication: Aug. 24, 2004, IEEE Photonics Technology Letters </xpl/RecentIssue.jsp?punumber=68> (vol. 16, Issue: 9 <http://ieeexplore.ieee.org/document/1325225/>.

* cited by examiner

*Primary Examiner* — John Bedtelyon
(74) *Attorney, Agent, or Firm* — Patterson + Sheridan, LLP (57) ABSTRACT

An optical apparatus comprises a first arm comprising a first optical waveguide configured to propagate a first optical signal, and a first thermo-optic (TO) phase shifter arranged proximate to the first optical waveguide. The optical apparatus further comprises a second arm comprising a second optical waveguide configured to propagate a second optical signal, and a second TO phase shifter arranged proximate to the second optical waveguide. The optical apparatus further comprises a thermal bridge arranged between the first TO phase shifter and the second TO phase shifter.

20 Claims, 8 Drawing Sheets

FIG. 8

THERMO-OPTIC PHASE SHIFTER WITH THERMAL BRIDGE

TECHNICAL FIELD

Embodiments presented in this disclosure generally relate to optical networking, and more specifically, to a thermo-optic phase shifter suitable for use in optical networking.

BACKGROUND

Optical switching devices, such as optical cross-connects, are widely used to create switch fabrics and dynamically configurable optical networks. To minimize link downtime and to enable continuous link reconfiguration, the optical switching devices may require switching speeds of about 100 nanoseconds (ns) or less. Additionally, low optical loss of the optical switching devices in an on-state and high extinction in an off-state may be beneficial to reduce an impairment to the link budget.

Various implementations may seek to strike a balance between switching speed and insertion loss for the optical switching devices. However, low-loss optical switching devices typically have switching latencies on the order of 100 microseconds (us), and high-speed optical switching devices typically have several decibels (dB) of insertion loss. Integrated optical gain components may be used to compensate for the insertion loss, which can add to the cost and power consumption of the optical switching devices.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is an optical apparatus comprising a first arm comprising a first optical waveguide configured to propagate a first optical signal, and a first thermo-optic (TO) phase shifter arranged proximate to the first optical waveguide. The optical apparatus further comprises a second arm comprising a second optical waveguide configured to propagate a second optical signal, and a second TO phase shifter arranged proximate to the second optical waveguide. The optical apparatus further comprises a thermal bridge arranged between the first TO phase shifter and the second TO phase shifter.

Another embodiment presented in this disclosure is an optical apparatus comprising a semiconductor layer comprising: a first optical waveguide, a first resistive heating element arranged proximate to the first optical waveguide, a second optical waveguide, and a second resistive heating element arranged proximate to the second optical waveguide. The optical apparatus further comprises one or more metal layers comprising: an anode coupled with at least the first resistive heating element, and a cathode coupled with at least the first resistive heating element. The optical apparatus further comprises a thermal bridge arranged between the first resistive heating element and the second resistive heating element. The thermal bridge is arranged in one of the semiconductor layer and the one or more metal layers.

Another embodiment presented in this disclosure is a method comprising receiving a first optical signal at a first optical waveguide, and driving a first thermo-optic phase shifter to provide a first phase shift to the first optical signal. The method further comprises receiving a second optical signal at a second optical waveguide, and driving a second thermo-optic phase shifter to provide a second phase shift to the second optical signal. The method further comprises conducting generated heat along a thermal bridge arranged between the first thermo-optic phase shifter and the second thermo-optic phase shifter.

Example Embodiments

According to various embodiments discussed herein, an optical apparatus comprises a first arm and a second arm. The first arm comprises a first optical waveguide configured to propagate a first optical signal, and a first thermo-optic (TO) phase shifter arranged proximate to the first optical waveguide. The second arm comprises a second optical waveguide configured to propagate a second optical signal, and a second TO phase shifter arranged proximate to the second optical waveguide. The optical apparatus further comprises a thermal bridge arranged between the first TO phase shifter and the second TO phase shifter.

Beneficially, the thermal bridge improves heat dissipation by the first TO phase shifter and the second TO phase shifter. In some cases, the thermal bridge tends to equilibrate or otherwise balance the temperatures of the first TO phase shifter and the second TO phase shifter. In this way, the first TO phase shifter and the second TO phase shifter have a more linear response, which can reduce harmonics generated when the first TO phase shifter and the second TO phase shifter are used to provide a dither signal. With the reduced harmonics, a higher-frequency dither signal may be used, and tuning performance of the optical apparatus is improved.

Figure 1:
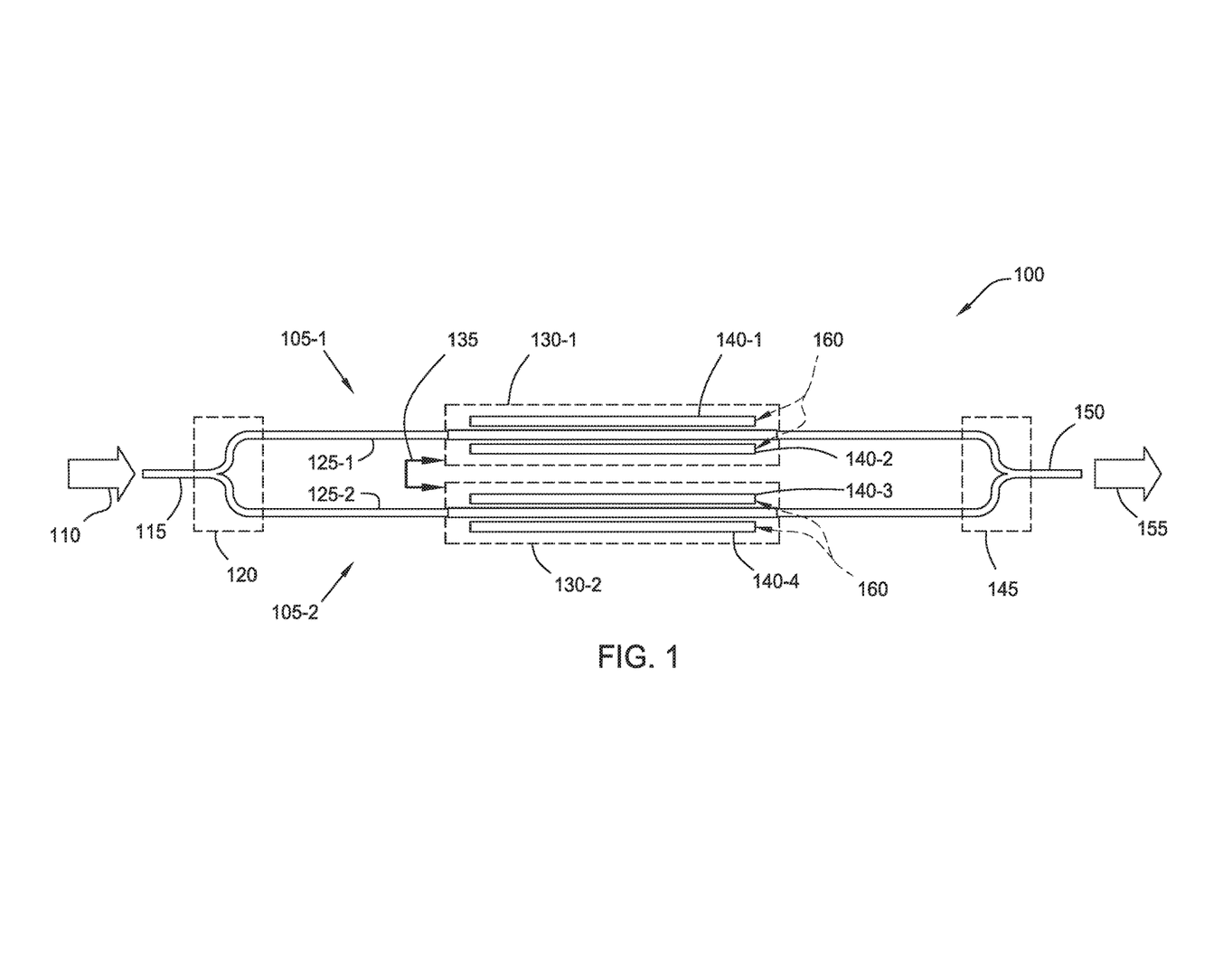
FIGS. 1 and 2 are diagrams of exemplary optical apparatuses with a thermal bridge, according to one or more embodiments.
Figure 2:
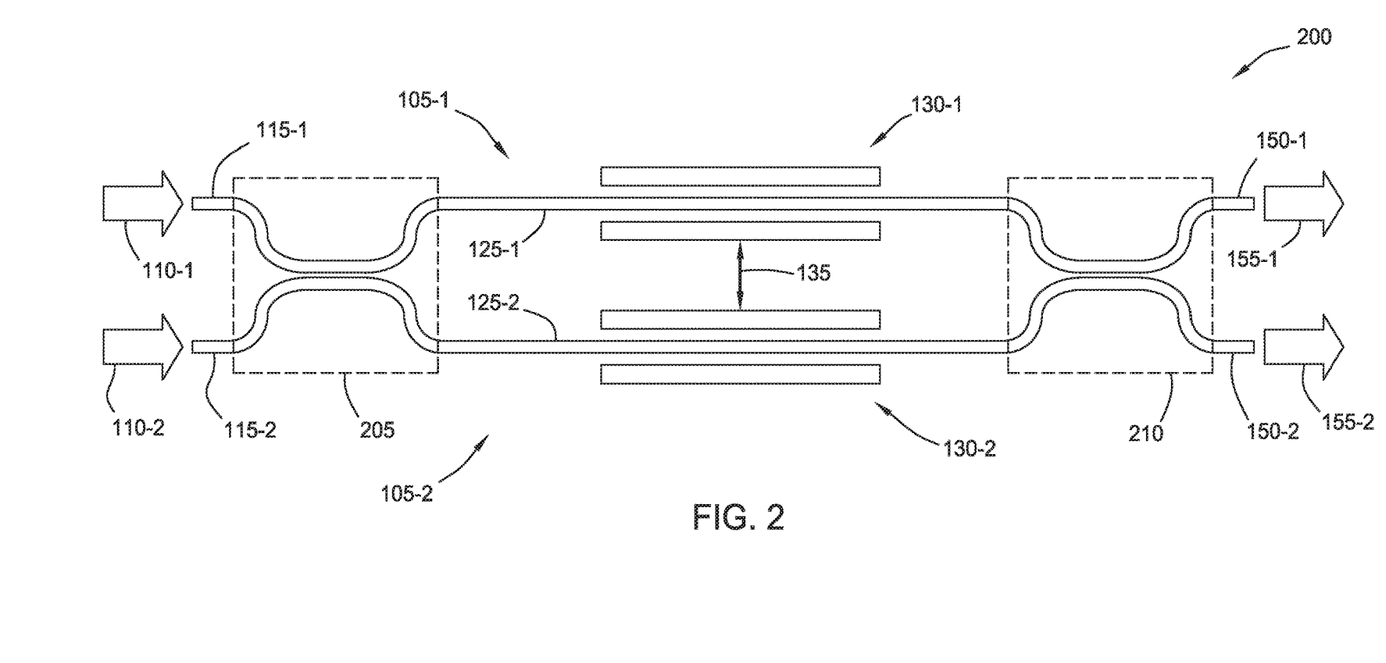

FIGS. 1 and 2 are diagrams of exemplary optical apparatuses 100, 200 with a thermal bridge 135, according to one or more embodiments. The optical apparatus 100 may be implemented in any suitable form, such as an optical switching device. In some embodiments, the optical apparatus 100 comprises a Mach-Zender interferometer (MZI) modulator. The optical apparatus 100 comprises an input 115 that receives an input optical signal 110, and a splitter 120 optically coupled with the input 115. The splitter 120 divides or otherwise distributes the optical power from the input optical signal 110 onto a first arm 105-1 (as a first optical signal) and onto a second arm 105-2 (as a second optical signal).

The first arm 105-1 comprises a first optical waveguide 125-1 that propagates the first optical signal. The first arm 105-1 further comprises a first thermo-optic (TO) phase shifter 130-1 that is arranged proximate to the first optical waveguide 125-1. The TO phase-shifter 130-1 adjusts a phase of the first optical signal propagated along the first optical waveguide 125-1.

The second arm 105-2 comprises a second optical waveguide 125-2 that propagates the second optical signal. The second arm 105-2 further comprises a second TO phase shifter 130-2 that is arranged proximate to the second optical waveguide 125-2. The TO phase-shifter 130-2 adjusts a phase of the second optical signal propagated along the second optical waveguide 125-2.

The TO phase shifters 130-1, 130-2 may have any implementation suitable for controlling a phase of the corresponding optical signals using the TO effect. In some embodiments, the first TO phase shifter 130-1 comprises resistive heating elements 140-1, 140-2 and the second TO phase shifter 130-2 comprises resistive heating elements 140-3, 140-4. In some embodiments, the resistive heating elements 140-1, 140-2, 140-3, 140-4 are formed in a same semiconductor layer as the first optical waveguide 125-1 and the second optical waveguide 125-2. In one example, the resistive heating elements 140-1, 140-2, 140-3, 140-4 are formed of a doped semiconductor material. In other embodiments, the resistive heating elements 140-1, 140-2, 140-3, 140-4 are formed in different layer(s) than the first optical waveguide 125-1 and the second optical waveguide 125-2.

In some embodiments, the first optical waveguide 125-1 and the second optical waveguide 125-2 are substantially parallel to each other. As shown, each of the resistive heating elements 140-1, 140-2, 140-3, 140-4 extends along a respective one of the first optical waveguide 125-1 and the second optical waveguide 125-2 and is substantially parallel thereto. Other relative orientations of the resistive heating elements 140-1, 140-2, 140-3, 140-4 are also possible.

As shown, the resistive heating elements 140-2, 140-3 are arranged between the first optical waveguide 125-1 and the second optical waveguide 125-2, the resistive heating element 140-1 is arranged proximate to the first optical waveguide 125-1 on an opposing side of the first optical waveguide 125-1 from the resistive heating element 140-2, and the resistive heating element 140-4 is arranged proximate to the second optical waveguide 125-2 on an opposing side of the second optical waveguide 125-2 from the resistive heating element 140-3.

Other implementations of the TO phase shifters 130-1, 130-2 are also possible. In one example, each of the TO phase shifters 130-1, 130-2 comprises a single resistive heating element. In another example, each of the TO phase shifters 130-1, 130-2 comprises multiple heating elements arranged along a single side of the first optical waveguide 125-1 and/or the second optical waveguide 125-2. In another example, one or both of the TO phase shifters 130-1, 130-2 comprise resistive heating elements that are formed in a different semiconductor layer than the optical waveguides 125-1, 125-2. In such a case, the TO phase shifters 130-1, 130-2 may be arranged above and/or below the optical waveguides 125-1, 125-2.

A phase controller 160 is coupled with the resistive heating elements 140-1, 140-2, 140-3, 140-4. The phase controller 160 may be implemented in any suitable form, such as a microprocessor, a digital signal processor (DSP), an application-specific integrated chip (ASIC), a field programmable gate array (FPGA), logic gates, combinations thereof, and so forth. The phase controller 160 drives control signals onto the resistive heating elements 140-1, 140-2, 140-3, 140-4, and the current that is carried along the resistive heating elements 140-1, 140-2, 140-3, 140-4 responsive to the control signals controls the heating applied to the first optical waveguide 125-1 and/or the second optical waveguide 125-2.

The optical apparatus 100 further comprises a combiner 145 that is optically coupled with the first optical waveguide 125-1 and the second optical waveguide 125-2. The combiner 145 combines the optical power of the first optical signal and the second optical signal, which may be phase-shifted by the TO phase shifters 130-1, 130-2, onto an output 150. An output optical signal 155 is output from the output 150. Thus, the output optical signal 155 is modulated based on the phase-shifting applied along the first arm 105-1 and the second arm 105-2.

In some cases, the TO phase shifters 130-1, 130-2 experience an asymmetric (e.g., a nonlinear) thermal response, tending to dissipate heat less quickly than a rate of generating heat. This asymmetry leads to the generation of harmonics when the TO phase shifters 130-1, 130-2 are used to provide a dither signal (e.g., during an optical biasing or other tuning process for the optical apparatus 100). A more linear response of the TO phase shifters 130-1, 130-2 can be achieved by improving heat dissipation of the TO phase shifters 130-1, 130-2 and/or providing an electrical pre-emphasis of signals.

One technique for improving heat dissipation includes reducing a thermal mass (i.e., a heat capacity) of the first optical waveguide 125-1, the second optical waveguide 125-2, and/or the TO phase shifters 130-1, 130-2, which may be accomplished by reducing their sizes. Another technique for improving heat dissipation includes decreasing a thickness of a bottom cladding layer below the optical waveguides 125-1, 125-2.

In embodiments described herein, a thermal bridge 135 provides a thermal leakage pathway between the first arm 105-1 and the second arm 105-2. In some embodiments, the thermal bridge 135 comprises a semiconductor or metallic bridge that reduces a thermal impedance between the first arm 105-1 and the second arm 105-2, which tends to equilibrate or otherwise balance the temperatures of the TO phase shifters 130-1, 130-2.

In this way, the thermal bridge 135 may be described as providing a thermal pre-emphasis of signals driving the TO phase shifters 130-1, 130-2. The degree of thermal pre-emphasis, and the response speed of the optical apparatus 100, is determined by the thermal conductivity of the thermal bridge 135. The thermal conductivity can be changed by adjusting one or more dimensions of the thermal bridge 135. For example, increasing a width and/or shortening a length of the thermal bridge 135 tends to improve the response speed of the optical apparatus 100.

The TO phase shifters 130-1, 130-2 may be used in coherent transmitters to tune the optical bias of the optical apparatus 100. In these applications, a dither signal is applied to the TO phase shifters 130-1 and/or 130-2, and feedback signal(s) are monitored to determine a proper tuning of the optical apparatus 100. This may be described as an automatic bias control (ABC) loop. The frequency of the dither signal fundamentally limits the speed and accuracy of the ABC loop, and using a higher-frequency dither signal improves the tuning performance.

In silicon photonic platforms, the response time of the TO phase shifters 130-1, 130-2 can be limited by the thickness of silica ($SiO_2$) buried oxide (BOX) cladding layers. For example, a thick cladding layer tends to reduce thermal dissipation, and thus slows the TO response by slowing the rate of cooling. Using the thermal bridge 135, a significant improvement in response speed can be realized despite a tradeoff with the thermal efficiency of the TO phase shifters 130-1, 130-2. However, the tradeoff is acceptable as only a small (e.g., about 1-2%) amplitude of the dither signal is typically required in some applications. Beneficially, a suitable response speed can be achieved without using electro-optic phase shifters, which tend to have a greater optical insertion loss.

Other applications of the thermal bridge 135 are also possible. For example, use of the thermal bridge 135 may improve the tuning of polarization demultiplexers, wavelength demultiplexers, and optical hybrids, as well as other active devices. Further, the thermal bridge 135 may be compatible with other modulator components, including semiconductor-insulator-semiconductor capacitor (SIS-CAP).

According to techniques discussed herein, a modulation speed of the optical apparatus 100 may be increased without requiring any changes to current fabrication processes. Further, implementation of the thermal bridge 135 is relatively simple, without requiring changes to control circuit voltages or current ranges. A tradeoff between the bandwidth and the tuning efficiency may be controlled by adjusting dimensions of thermal bridge 135.

The optical apparatus 200 is depicted as a 2×2 optical cross-connect comprising the thermal bridge 135. The optical apparatus 200 comprises a first input 115-1 that receives a first input optical signal 110-1, and a second input 115-2 that receives a second input optical signal 110-2.

The optical apparatus 200 further comprises an input optical coupler 205 that receives a plurality of input optical signals (including the first input optical signal 110-1 and the second input optical signal 110-2), provides a first optical signal to the first arm 105-1, and provides a second optical signal to the second arm 105-2. Thus, the input optical coupler 205 distributes the optical power from the plurality of input optical signals among the first optical signal and the second optical signal.

The optical apparatus 200 further comprises an output optical coupler 210 that receives phase-controlled optical signals from the first arm 105-1 and from the second arm 105-2, provides a first output optical signal 155-1 to a first output 155-1, and provides a second output optical signal 155-2 to a second output 155-2. Thus, the output optical coupler 210 distributes the optical power from the plurality of phase-controlled optical signals to the first output 155-1 and the second output 155-2.

Figure 3:
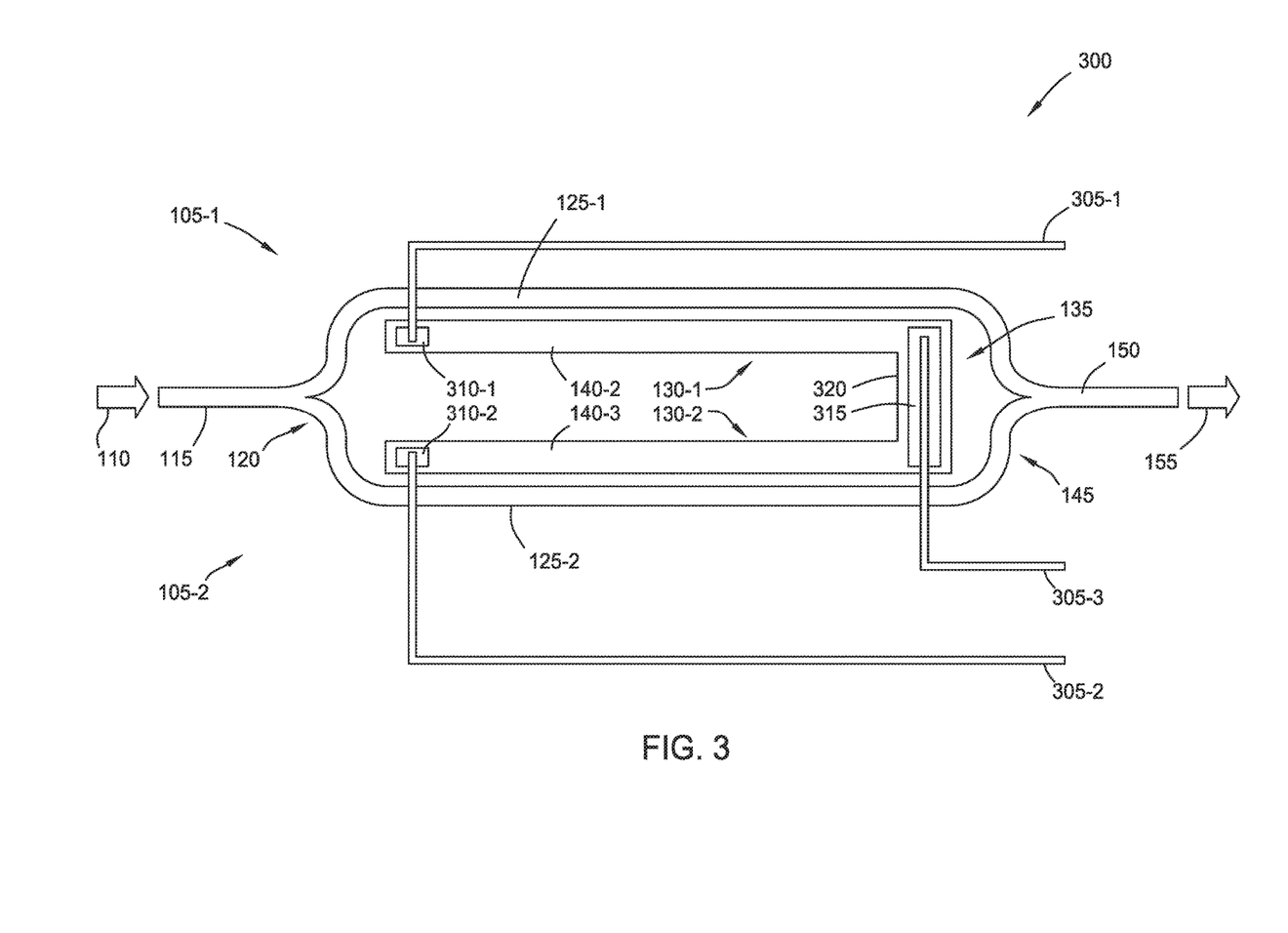
FIG. 3 is a diagram of an exemplary optical apparatus with a thermal bridge comprising a doped semiconductor material, according to one or more embodiments.

FIG. 3 is a diagram of an exemplary optical apparatus 300 with a thermal bridge comprising a doped semiconductor material, according to one or more embodiments. Features of the optical apparatus 300 may be used in conjunction with other embodiments, such as being controlled using the phase controller 160 of FIG. 1.

The optical apparatus 300 comprises resistive heating elements 140-2, 140-3 arranged between the first optical waveguide 125-1 and the second optical waveguide 125-2. In some embodiments, the resistive heating element 140-2 extends along the length of the first optical waveguide 125-1, and the resistive heating element 140-3 extends along the length of the second optical waveguide 125-2. As shown, a length of the resistive heating element 140-2 is substantially the same as a length of the first optical waveguide 125-1, and a length of the resistive heating element 140-3 is substantially the same as a length of the second optical waveguide 125-2. Stated another way, a length of the thermal bridge 135 is substantially the same as a length of the first arm 105-1 and of the second arm 105-2. However, other embodiments may have resistive heating elements 140-2, 140-3 with different lengths (e.g., significantly shorter than the first optical waveguide 125-1 and the second optical waveguide 125-2). In such a case, other components (such as a modulator) may be arranged along the first optical waveguide 125-1 and/or the second optical waveguide 125-2.

An electrical contact 310-1 is coupled with the resistive heating element 140-2, and an electrical contact 310-2 is coupled with the resistive heating element 140-3. In some embodiments, the electrical contacts 310-1, 310-2 are formed in a metal layer. A control signal 305-1 is applied to the electrical contact 310-1, and a control signal 305-2 is applied to the electrical contact 310-2.

A semiconductor segment 320 connects the resistive heating elements 140-2, 140-3. The semiconductor segment 320 represents one example of the thermal bridge 135. In some embodiments, the semiconductor segment 320 comprises a doped semiconductor material, which may be doped similarly to the resistive heating elements 140-2, 140-3. The semiconductor segment 320 extends orthogonal to the resistive heating elements 140-2, 140-3, although other orientations are possible.

An electrical contact 315 is coupled with the semiconductor segment 320. The electrical contact 315 may be formed in the same metal layer as the electrical contacts 310-1, 310-2. As shown, the electrical contact 315 comprises an elongated electrical contact that extends along the length of the semiconductor segment 320. Other arrangements of the electrical contact 315 are also possible, such as a non-elongated electrical contact, multiple electrical contacts (which may be coupled with a same control signal), and so forth.

A control signal 305-3 is applied to the electrical contact 315. The control signals 305-1, 305-2, 305-3 control the amount of current that is carried along the resistive heating elements 140-2, 140-3. The amount of current controls the heating applied to the first optical waveguide 125-1 and/or the second optical waveguide 125-2. In some embodiments, the electrical contact 315 is coupled with an electrical ground.

The electrical contacts 310-1, 310-2 are disposed at a first end of the resistive heating elements 140-2, 140-3, and the electrical contact 315 is disposed at an opposing second end of the resistive heating elements 140-2, 140-3. Alternative arrangements of the electrical contacts 310-1, 310-2, 315 are also possible. Further, in one alternate embodiment, the electrical contact 315 extends between the resistive heating elements 140-2, 140-3 without the semiconductor segment 320.

Figure 4:
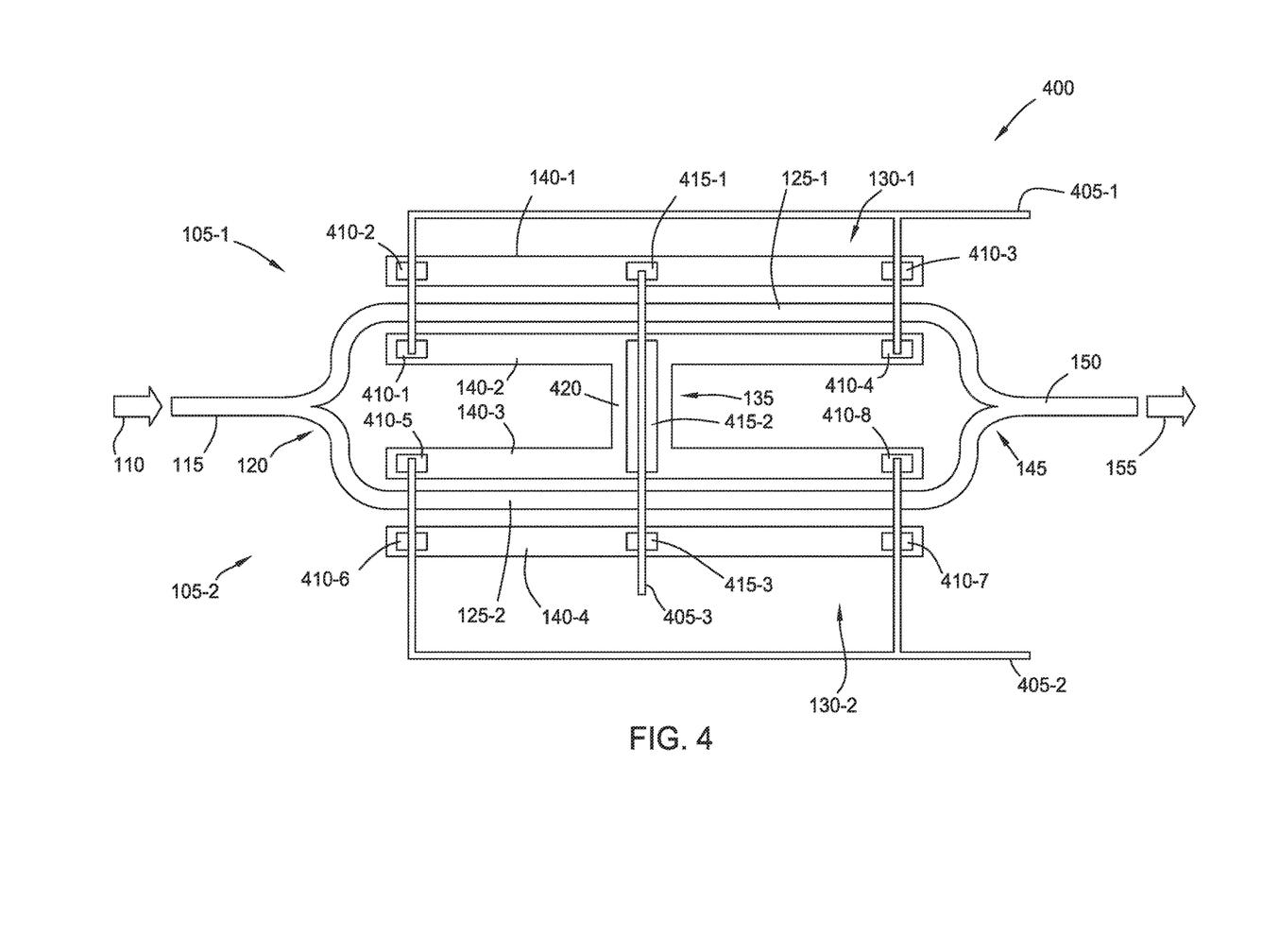
FIG. 4 is a diagram of an exemplary optical apparatus with a thermal bridge comprising a doped semiconductor material, according to one or more embodiments.

FIG. 4 is a diagram of an exemplary optical apparatus 400 with a thermal bridge comprising a doped semiconductor material, according to one or more embodiments. Features of the optical apparatus 400 may be used in conjunction with other embodiments, such as being controlled using the phase controller 160 of FIG. 1.

The first TO phase shifter 130-1 comprises the resistive heating elements 140-1, 140-2. An electrical contact 410-2 is coupled with the resistive heating element 140-1 at a first end, and an electrical contact 410-3 is coupled at an opposite second end of the resistive heating element 140-1. An electrical contact 410-1 is coupled with the resistive heating element 140-2 at a first end, and an electrical contact 410-4 is coupled at an opposite second end of the resistive heating element 140-2.

The second TO phase shifter 130-2 comprises the resistive heating elements 140-3, 140-4. An electrical contact 410-5 is coupled with the resistive heating element 140-3 at a first end, and an electrical contact 410-8 is coupled at an opposite second end of the resistive heating element 140-3. An electrical contact 410-6 is coupled with the resistive heating element 140-4 at a first end, and an electrical contact 410-7 is coupled at an opposite second end of the resistive heating element 140-4.

A semiconductor segment 420 connects the resistive heating elements 140-2, 140-3. The semiconductor segment 420 represents one example of the thermal bridge 135. In some embodiments, the semiconductor segment 420 comprises a doped semiconductor material, which may be doped similarly to the resistive heating elements 140-2, 140-3. The semiconductor segment 420 extends orthogonal to the resistive heating elements 140-2, 140-3, although other orientations are possible.

An electrical contact 415-2 is coupled with the semiconductor segment 420. The electrical contact 415-2 may be formed in the same metal layer as other electrical contacts 410-1, . . . , 410-8, 415-1, 415-3. As shown, the electrical contact 415-2 comprises an elongated electrical contact that extends along the length of the semiconductor segment 420. Other arrangements of the electrical contact 415-2 are also possible, such as a non-elongated electrical contact, multiple electrical contacts (which may be coupled with a same control signal), and so forth.

An electrical contact 415-1 is coupled with the resistive heating element 140-1 at a position between the electrical contacts 410-2, 410-3. For example, the electrical contact 415-1 may be substantially centered along a length of the resistive heating element 140-1 (e.g., at an equal distance from the electrical contacts 410-2, 410-3). An electrical contact 415-3 is coupled with the resistive heating element 140-4 at a position between the electrical contacts 410-6, 410-7. For example, the electrical contact 415-3 may be substantially centered along a length of the resistive heating element 140-4 (e.g., at an equal distance from the electrical contacts 410-6, 410-7).

A control signal 405-1 is applied to the electrical contacts 410-1, 410-2, 410-3, 410-4, and a control signal 405-2 is applied to the electrical contacts 410-5, 410-6, 410-7, 410-8. A control signal 405-3 is applied to the electrical contacts 415-1, 415-2, 415-3. In some embodiments, the electrical contacts 415-1, 415-2, 415-3 are coupled with an electrical ground.

In one alternate implementation, different control signals may be applied to different electrical contacts connected to a particular resistive heating element (e.g., electrical contacts 410-1, 410-4 connected to the resistive heating element 140-2 are driven with different control signals). In another alternate implementation, different control signals may be applied to different resistive heating elements (e.g., electrical contacts 410-1, 410-4 connected to the resistive heating element 140-2 are driven with a control signal different than the electrical contacts 410-2, 410-3 connected to the resistive heating element 140-1).

Figure 5:
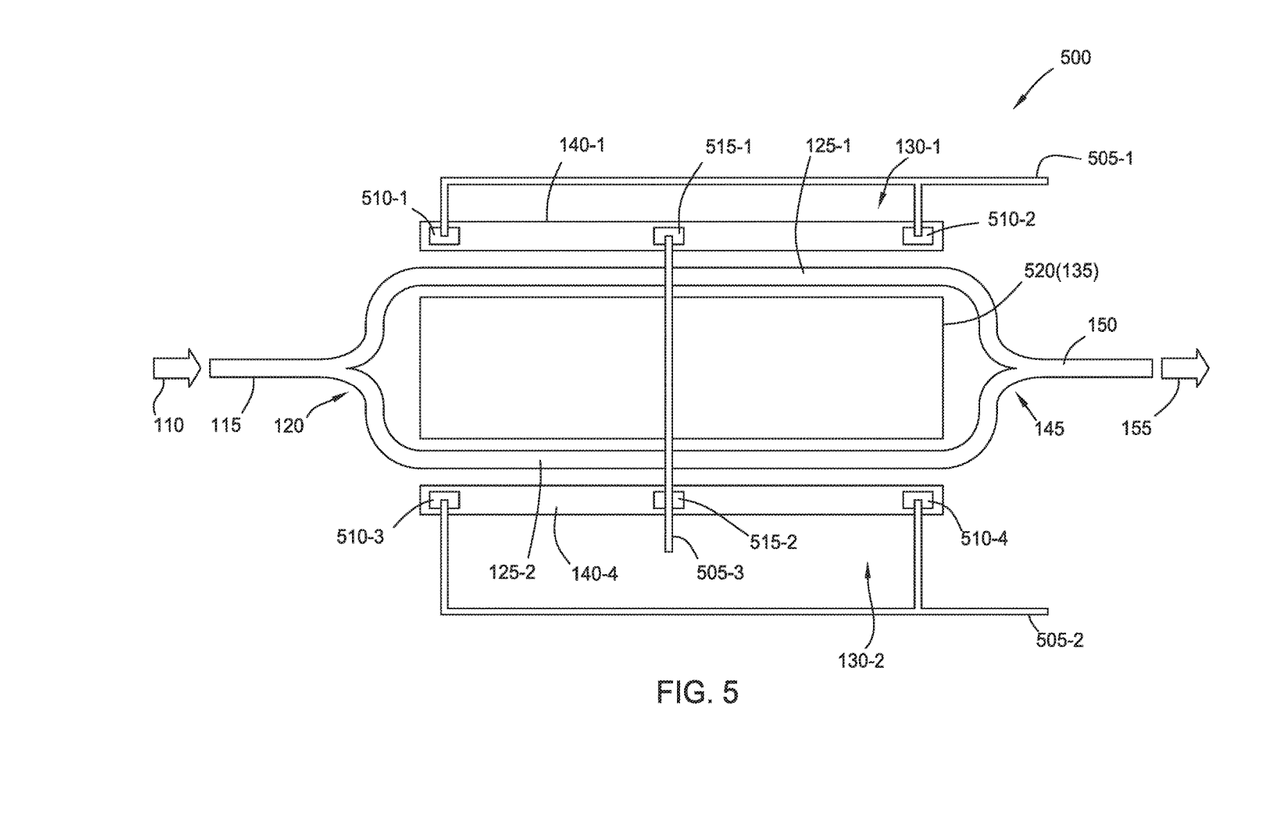
FIG. 5 is a diagram of an exemplary optical apparatus with a thermal bridge comprising an undoped semiconductor material, according to one or more embodiments.

FIG. 5 is a diagram of an exemplary optical apparatus 500 with a thermal bridge comprising an undoped semiconductor material, according to one or more embodiments. Features of the optical apparatus 500 may be used in conjunction with other embodiments, such as being controlled using the phase controller 160 of FIG. 1.

The first TO phase shifter 130-1 comprises the resistive heating element 140-1, and the second TO phase shifter 130-2 comprises the resistive heating element 140-4. An electrical contact 510-1 is coupled with the resistive heating element 140-1 at a first end, and an electrical contact 510-2 is coupled at an opposite second end of the resistive heating element 140-1. An electrical contact 515-1 is coupled with the resistive heating element 140-1 at a position between the electrical contacts 510-1, 510-2. For example, the electrical contact 515-1 may be substantially centered along a length of the resistive heating element 140-1 (e.g., at an equal distance from the electrical contacts 510-1, 510-2).

An electrical contact 510-3 is coupled with the resistive heating element 140-4 at a first end, and an electrical contact 510-4 is coupled at an opposite second end of the resistive heating element 140-4. An electrical contact 515-2 is coupled with the resistive heating element 140-4 at a position between the electrical contacts 510-3, 510-4. For example, the electrical contact 515-2 may be substantially centered along a length of the resistive heating element 140-4 (e.g., at an equal distance from the electrical contacts 510-3, 510-4).

A semiconductor region 520 is arranged between the first optical waveguide 125-1 and the second optical waveguide 125-2. The semiconductor region 520 represents one example of the thermal bridge 135. In some embodiments, the semiconductor region 520 comprises an undoped semiconductor material.

As shown, a length of the semiconductor region 520 is substantially the same as a length of the first optical waveguide 125-1 and the second optical waveguide 125-2, although other lengths are also possible. A width of the semiconductor region 520 extends between the first optical waveguide 125-1 and the second optical waveguide 125-2. In some cases, increasing the length and/or shortening a width of the semiconductor region 520 tends to improve the response speed of the optical apparatus 500. In one embodiment, the semiconductor region 520 is a continuous region that occupies a majority of an area defined between the first optical waveguide 125-1 and the second optical waveguide 125-2.

Figure 6:
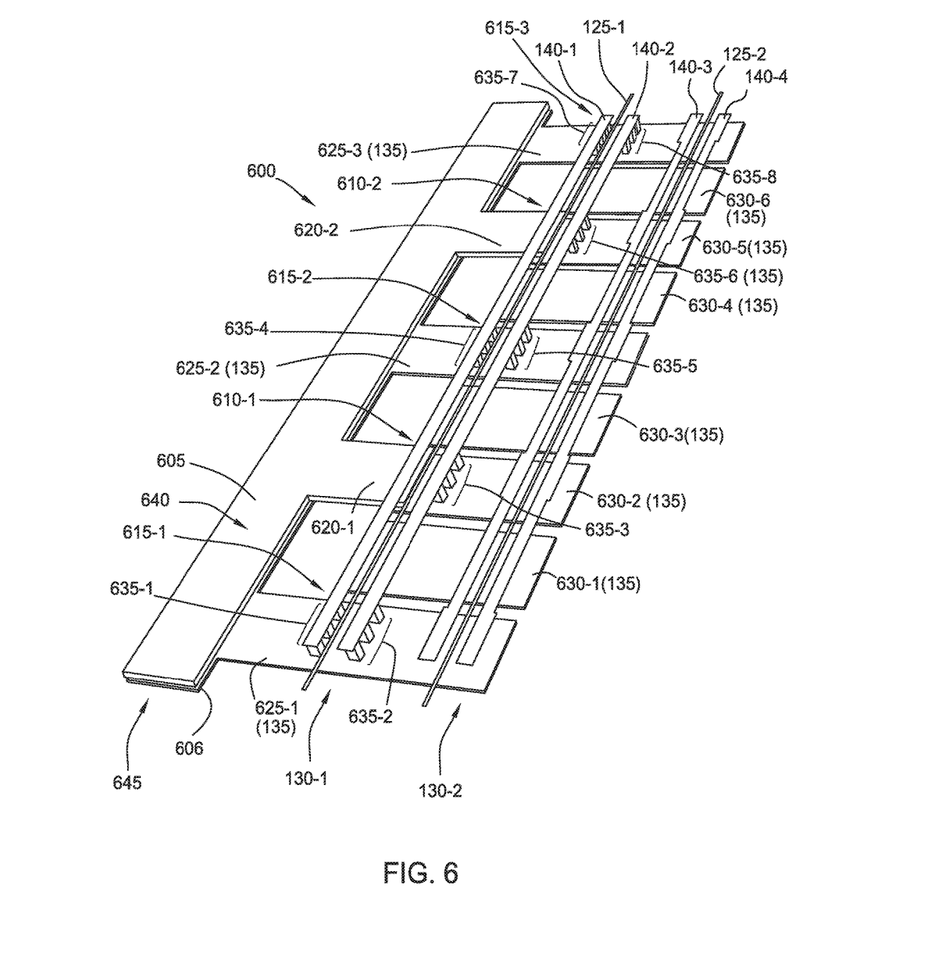
FIG. 6 is a diagram of an exemplary optical apparatus with a plurality of thermal bridges, according to one or more embodiments.

FIG. 6 is a diagram of an exemplary optical apparatus 600 with a plurality of thermal bridges, according to one or more embodiments. More specifically, the diagram shows a perspective view of the optical apparatus 600. Features of the optical apparatus 600 may be used in conjunction with other embodiments, such as being controlled using the phase controller 160 of FIG. 1.

The optical apparatus 600 comprises a cathode 605 and an anode 606 that are arranged in one or more metal layers. The cathode 605 and the anode 606 represent examples of the electrical contacts depicted in FIGS. 3-5. In some embodiments, the cathode 605 is arranged in a first metal layer, and the anode 606 is arranged in a second metal layer.

The cathode 605 comprises a cathode base 640 and a plurality of cathode extensions 620-1, 620-2 that project from the cathode base 640. As shown, the cathode extensions 620-1, 620-2 project in a direction that is substantially perpendicular to a length of the cathode base 640, although other relative arrangements are possible. The anode 606 comprises an anode base 645 and a plurality of anode extensions 625-1, 625-2, 625-3 that project from the anode base 645. As shown, the anode extensions 625-1, 625-2, 625-3 project in a direction that is substantially perpendicular to a length of the anode base 645, although other relative arrangements are possible. In some embodiments, the cathode 605 and the anode 606 are partly overlapping. As shown, the cathode base 640 overlaps the anode base 645, and the cathode extensions 620-1, 620-2 are non-overlapping with the anode extensions 625-1, 625-2, 625-3.

The anode 606 is coupled with the first resistive heating element 140-1 at a plurality of first regions 615-1, 615-2, 615-3 along a length of the first optical waveguide 125-1. A plurality of contacts 635-1 couple the anode extension 625-1 to the first resistive heating element 140-1 at the first region 615-1, a plurality of contacts 635-4 couple the anode extension 625-2 to the first resistive heating element 140-1 at the first region 615-2, and a plurality of contacts 635-7 couple the anode extension 635-7 to the first resistive heating element 140-1 at the first region 615-3. The cathode 605 is coupled with the first resistive heating element 140-1 at a plurality of second regions 610-1, 610-2 along the length of the first optical waveguide 125-1. As shown, the cathode extensions 620-1, 620-2 contacts the first resistive heating element 140-1. Each of the cathode extensions 620-1, 620-2 also contacts a respective cathode extension 630-2, 630-5, which are formed in a different metal layer than the cathode extensions 620-1, 620-2. As shown, the cathode extensions 630-2, 630-5 extend in a same direction as the corresponding cathode extensions 620-1, 620-2, although other relative arrangements are possible. In some embodiments, the plurality of first regions 615-1, 615-2, 615-3 and the plurality of second regions 610-1, 610-2 are arranged in an alternating arrangement.

The anode 606 is coupled with the second resistive heating element 140-2 at a plurality of regions. A plurality of contacts 635-2 couples the anode extension 625-1 to the second resistive heating element 140-2, a plurality of contacts 635-5 couples the anode extension 625-2 to the second resistive heating element 140-2, and a plurality of contacts 635-8 couples the anode extension 625-3 to the second resistive heating element 140-2.

As shown, the anode 606 and the cathode 605 are not directly electrically coupled with the resistive heating elements 140-3, 140-4. Thus, the optical apparatus 600 is configured to drive the arm 130-1 and not to drive the arm 130-2.

The optical apparatus 600 further comprises a plurality of sections 630-1, 630-3, 630-4, 630-6 that thermally couple the resistive heating elements 140-1, 140-2, 140-3, 140-4. In some embodiments, the plurality of sections 630-1, 630-3, 630-4, 630-6 are formed in one or more metal layers, e.g., a same metal layer as the anode 606.

A plurality of contacts 635-3 couples the second resistive heating element 140-2 to the cathode extension 630-2, to the cathode extension 620-1, and a plurality of contacts 635-6 couples the second resistive heating element 140-2 to the cathode extension 630-5, to the cathode extension 620-2.

As shown, each of the anode extensions 625-1, 625-2, 625-3, the sections 630-1, 630-3, 630-4, 630-6, and the cathode extensions 630-2, 630-5 represent examples of thermal bridges 135 thermally coupling the resistive heating elements 140-1, 140-2, 140-3, 140-4. Thus, the optical apparatus 600 comprises a plurality of thermal bridges 135.

Figure 7:
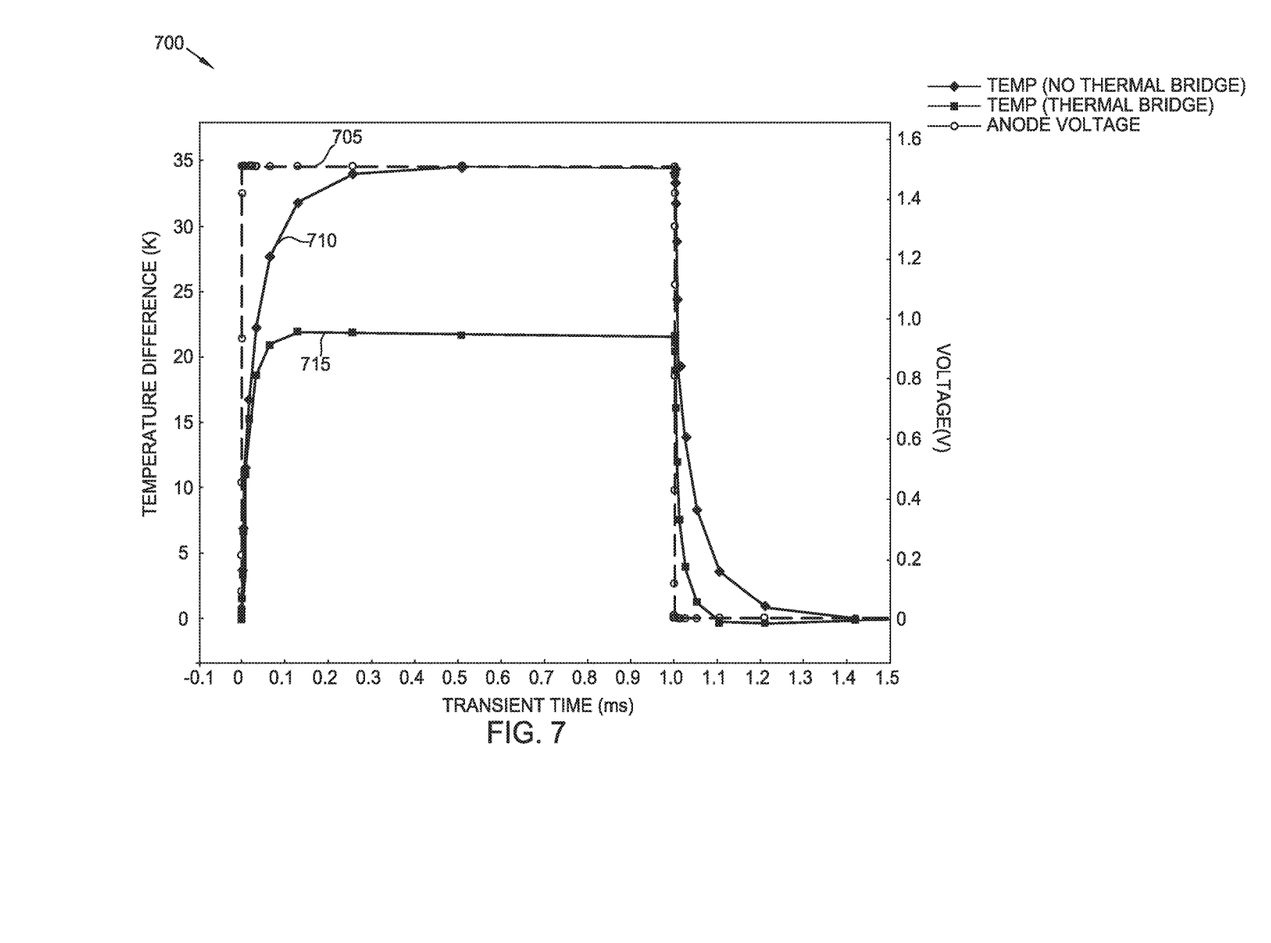
FIG. 7 illustrates exemplary operation of an optical apparatus with a thermal bridge, according to one or more embodiments.

FIG. 7 illustrates exemplary operation of an optical apparatus with a thermal bridge, according to one or more embodiments. The features illustrated in graph 700 may be used in conjunction with other embodiments, such as the optical apparatuses 300, 400, 500, 600 illustrated in FIGS. 3-6.

The graph 700 comprises a plot 705 representing an anode voltage (e.g., a control signal driven on the anode 606 of FIG. 6), a plot 710 representing a change in temperature for a TO phase shifter that does not include a thermal bridge when driven with the anode voltage, and a plot 715 representing a change in temperature for the TO phase shifter with the thermal bridge. As shown, a rise time (here, from 0% to 90% of a settled level) of the plot 715 is improved by about 60% from the rise time of the plot 710. Similarly, a fall time (here, from 100% to 10% of the settled level) of the plot 715 is improved by about 60% from the fall time of the plot 710.

When driven with the same anode voltage (or electrical power), the amplitude of the temperature difference of the plot 715 is less than an amplitude of the temperature different of the plot 710. Thus, using a thermal bridge, a significant improvement in response speed of the TO phase shifter can be realized at the expense of thermal efficiency. However, the tradeoff will be acceptable as only a small amplitude is typically driven on the TO phase shifter in most applications where the response speed of TO phase shifter is critical.

Figure 8:
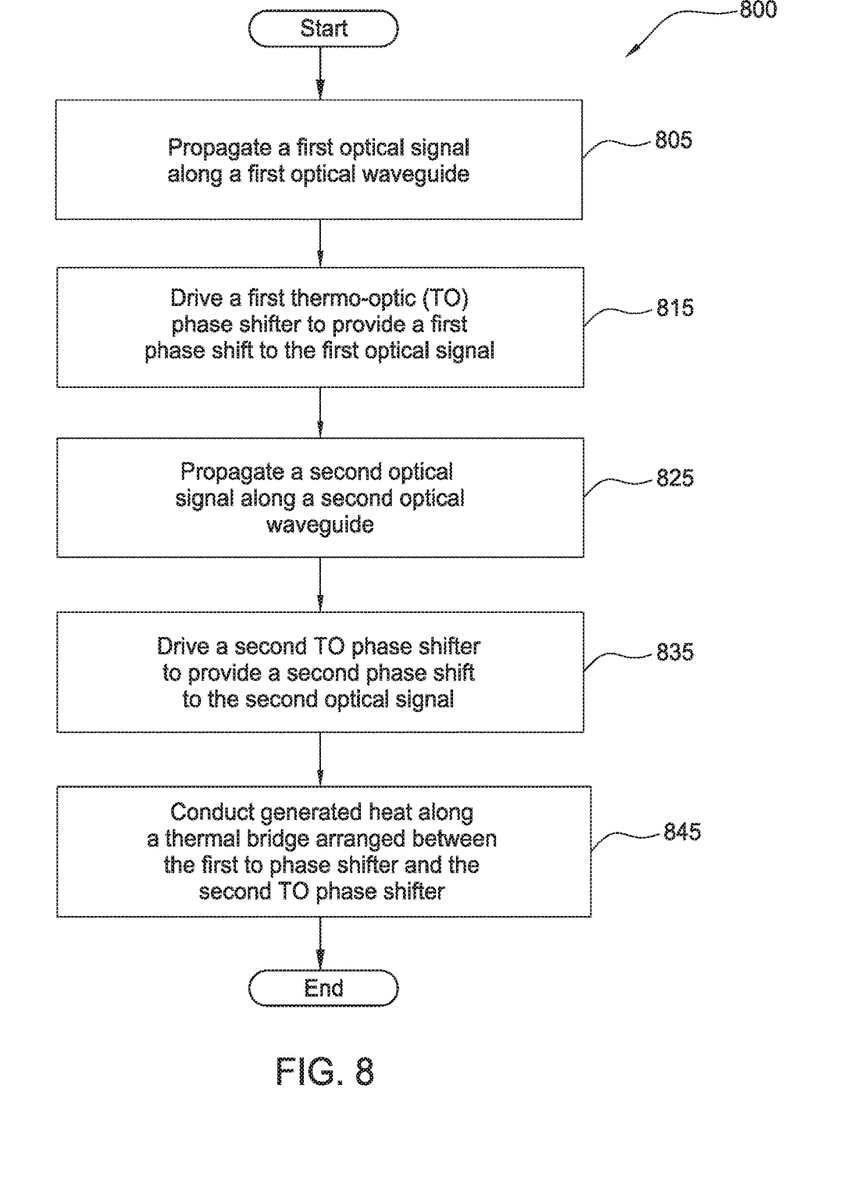
FIG. 8 is an exemplary method that is suitable for use with an optical apparatus with a thermal bridge, according to one or more embodiments.

FIG. 8 is an exemplary method 800 that is suitable for use with an optical apparatus with a thermal bridge, according to one or more embodiments. The features of the method 800 may be used in conjunction with other embodiments, such as the optical apparatuses 300, 400, 500, 600 of FIGS. 3-6.

Method 800 begins at block 805, where a first optical signal propagates along a first optical waveguide. At block 815, a first thermo-optic phase shifter is driven to provide a first phase shift to the first optical signal. At block 825, a second optical signal propagates along a second optical waveguide. At block 835, a second thermo-optic phase shifter is driven to provide a second phase shift to the second optical signal. At block 845, generated heat is conducted along a thermal bridge arranged between the first TO phase shifter and the second TO phase shifter. The method 800 ends following completion of block 845.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments, and advantages are merely illustrative and are not considered elements or limitations of the appended claims except where explicitly recited in a claim(s).

Aspects of the present disclosure are described above with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. An optical apparatus comprising:
a first arm comprising:
  a first optical waveguide configured to propagate a first optical signal; and
  a first thermo-optic (TO) phase shifter arranged proximate to the first optical waveguide;
a second arm comprising:
  a second optical waveguide configured to propagate a second optical signal; and
  a second TO phase shifter arranged proximate to the second optical waveguide; and
a thermal bridge arranged between the first TO phase shifter and the second TO phase shifter.

2. The optical apparatus of claim 1, further comprising:
an input optical coupler configured to, using a plurality of input optical signals, provide the first optical signal to the first arm and provide the second optical signal to the second arm; and
an output optical coupler configured to, using the propagated first optical signal and the propagated second optical signal, provide a plurality of output optical signals.

3. The optical apparatus of claim 1,
wherein the first TO phase shifter comprises a first resistive heating element, and
wherein the second TO phase shifter comprises a second resistive heating element.

4. The optical apparatus of claim 3,
wherein the thermal bridge comprises an undoped semiconductor material arranged between the first optical waveguide and the second optical waveguide.

5. The optical apparatus of claim 4, wherein the thermal bridge is a continuous region that occupies a majority of the area between the first optical waveguide and the second optical waveguide.

6. The optical apparatus of claim 3, wherein the thermal bridge comprises a metal material.

7. The optical apparatus of claim 3,
wherein each of the first resistive heating element, the second resistive heating element, and the thermal bridge comprises a same semiconductor material.

8. The optical apparatus of claim 3,
wherein the first resistive heating element and the second resistive heating element are arranged between the first optical waveguide and the second optical waveguide.

9. The optical apparatus of claim 8,
wherein the first TO phase shifter further comprises a third resistive heating element arranged proximate to the first optical waveguide on an opposing side of the first optical waveguide from the first resistive heating element, and
wherein the second TO phase shifter further comprises a fourth resistive heating element arranged proximate to the second optical waveguide on an opposing side of the second optical waveguide from the second resistive heating element.

10. The optical apparatus of claim 3, wherein the thermal bridge is electrically grounded.

11. An optical apparatus comprising:
a semiconductor layer comprising:
  a first optical waveguide;
  a first resistive heating element arranged proximate to the first optical waveguide;
  a second optical waveguide;
  a second resistive heating element arranged proximate to the second optical waveguide;
one or more metal layers comprising:
  an anode coupled with at least the first resistive heating element; and
  a cathode coupled with at least the first resistive heating element; and
a thermal bridge arranged between the first resistive heating element and the second resistive heating element, wherein the thermal bridge is arranged in one of the semiconductor layer and the one or more metal layers.

12. The optical apparatus of claim 11, wherein the thermal bridge is arranged in the semiconductor layer and comprises an undoped semiconductor material.

13. The optical apparatus of claim 11,
wherein each of the first resistive heating element, the second resistive heating element, and the thermal bridge comprises a same semiconductor material.

14. The optical apparatus of claim 11, wherein the thermal bridge is arranged in the one or more metal layers.

15. The optical apparatus of claim 11, wherein the anode is coupled with the first resistive heating element at a plurality of first regions along a length of the first optical waveguide,
wherein the cathode is coupled with the first resistive heating element at a plurality of second regions along the length of the first optical waveguide,
wherein the plurality of first regions and the plurality of second regions are in an alternating arrangement,
wherein the thermal bridge is one of a plurality of thermal bridges, and
wherein each of the plurality of thermal bridges is arranged between a respective first region and a respective second region.

16. The optical apparatus of claim 11, wherein the anode is arranged in a first metal layer of the one or more metal layers,
wherein the cathode is arranged in a second metal layer of the one or more layers, and
wherein the anode and the cathode are partly overlapping.

17. The optical apparatus of claim 11,
wherein the first resistive heating element and the second resistive heating element are arranged between the first optical waveguide and the second optical waveguide.

18. The optical apparatus of claim 17,
wherein the semiconductor layer further comprises:
a third resistive heating element arranged proximate to the first optical waveguide on an opposing side of the first optical waveguide from the first resistive heating element, and
a fourth resistive heating element arranged proximate to the second optical waveguide on an opposing side of the second optical waveguide from the second resistive heating element.

19. The optical apparatus of claim 11, wherein the thermal bridge is electrically coupled with the cathode.

20. A method comprising:
receiving a first optical signal at a first optical waveguide;
driving a first thermo-optic phase shifter to provide a first phase shift to the first optical signal;
receiving a second optical signal at a second optical waveguide;
driving a second thermo-optic phase shifter to provide a second phase shift to the second optical signal; and
conducting generated heat along a thermal bridge arranged between the first thermo-optic phase shifter and the second thermo-optic phase shifter.

* * * * *